(12) United States Patent
Ebert et al.

(10) Patent No.: US 12,326,965 B2
(45) Date of Patent: Jun. 10, 2025

(54) CRYPTOGRAPHIC DATA STORAGE

(71) Applicant: Cryptowerk Corp., Redwood City, CA (US)

(72) Inventors: Peter Ebert, Menlo Park, CA (US); Jochen Bedersdorfer, San Francisco, CA (US)

(73) Assignee: CRYPTOWERK CORP., San Mateo, CA (US)

( * ) Notice: Subject to any disclaimer, the term of this patent is extended or adjusted under 35 U.S.C. 154(b) by 0 days.

(21) Appl. No.: 17/391,967

(22) Filed: Aug. 2, 2021

(65) Prior Publication Data

US 2021/0365594 A1    Nov. 25, 2021

Related U.S. Application Data

(63) Continuation of application No. 16/395,232, filed on Apr. 26, 2019, now Pat. No. 11,080,433.

(60) Provisional application No. 62/664,207, filed on Apr. 29, 2018.

(51) Int. Cl.
| | | |
|---|---|---|
| G06F 21/00 | (2013.01) | |
| G06F 16/182 | (2019.01) | |
| G06F 21/60 | (2013.01) | |
| G06F 21/78 | (2013.01) | |
| H04L 9/06 | (2006.01) | |
| H04L 9/08 | (2006.01) | |
| H04L 9/00 | (2022.01) | |

(52) U.S. Cl.
CPC .......... *G06F 21/78* (2013.01); *G06F 16/1824* (2019.01); *G06F 21/602* (2013.01); *H04L 9/0643* (2013.01); *H04L 9/0822* (2013.01); *H04L 9/50* (2022.05)

(58) Field of Classification Search
CPC .... G06F 21/78; G06F 21/602; G06F 16/1824; G06F 16/14; H04L 9/0643; H04L 9/0822; H04L 2209/38; H04L 9/0866; H04L 9/3239
See application file for complete search history.

(56) References Cited

U.S. PATENT DOCUMENTS

| | | | |
|---|---|---|---|
| 8,954,728 B1 | 2/2015 | Juels et al. | 713/155 |
| 9,824,095 B1 | 11/2017 | Taylor et al. | |
| 2008/0195583 A1 | 8/2008 | Hsu et al. | |
| 2009/0044017 A1 | 2/2009 | Teranishi et al. | 713/176 |
| 2009/0138710 A1 | 5/2009 | Minematsu | 713/170 |
| 2010/0212017 A1 | 8/2010 | Li et al. | 726/26 |
| 2012/0047284 A1 | 2/2012 | Tarkoma | 709/247 |
| 2014/0002749 A1 | 1/2014 | Pora et al. | 348/725 |
| 2014/0289539 A1* | 9/2014 | Osterwalder | H04L 9/3242 713/193 |
| 2018/0082043 A1 | 3/2018 | Witchey et al. | |

(Continued)

FOREIGN PATENT DOCUMENTS

WO    2018/026727 A1    2/2018    ............ G06Q 30/00

*Primary Examiner* — William A Corum, Jr.
(74) *Attorney, Agent, or Firm* — Slayden Grubert Beard PLLC

(57) ABSTRACT

The present application concerns a method and a system of storing one or more service data items. To store and share in particular confidential data, the one or more service data items are partitioned into one or more data stores. The one or more data stores are stored. Metadata of the one or more data stores is generated and the metadata is stored in a metadata database.

14 Claims, 3 Drawing Sheets

Exemplary embodiment A

(56) References Cited

U.S. PATENT DOCUMENTS

| | | |
|---|---|---|
| 2018/0096349 A1 | 4/2018 | Mcdonald et al. |
| 2018/0130050 A1* | 5/2018 | Taylor ................... H04L 9/3236 |
| 2018/0159689 A1 | 6/2018 | Keuffer et al. |
| 2019/0066101 A1* | 2/2019 | Mitchell ............. G06F 21/6218 |
| 2019/0147078 A1 | 5/2019 | Dageville et al. |
| 2019/0171849 A1 | 6/2019 | Assenmacher |
| 2019/0228133 A1* | 7/2019 | Ansari ................... G06F 21/64 |
| 2019/0260592 A1 | 8/2019 | Nguyen et al. |
| 2020/0287898 A1 | 9/2020 | Weaver et al. |
| 2020/0366489 A1 | 11/2020 | Assenmacher |

* cited by examiner

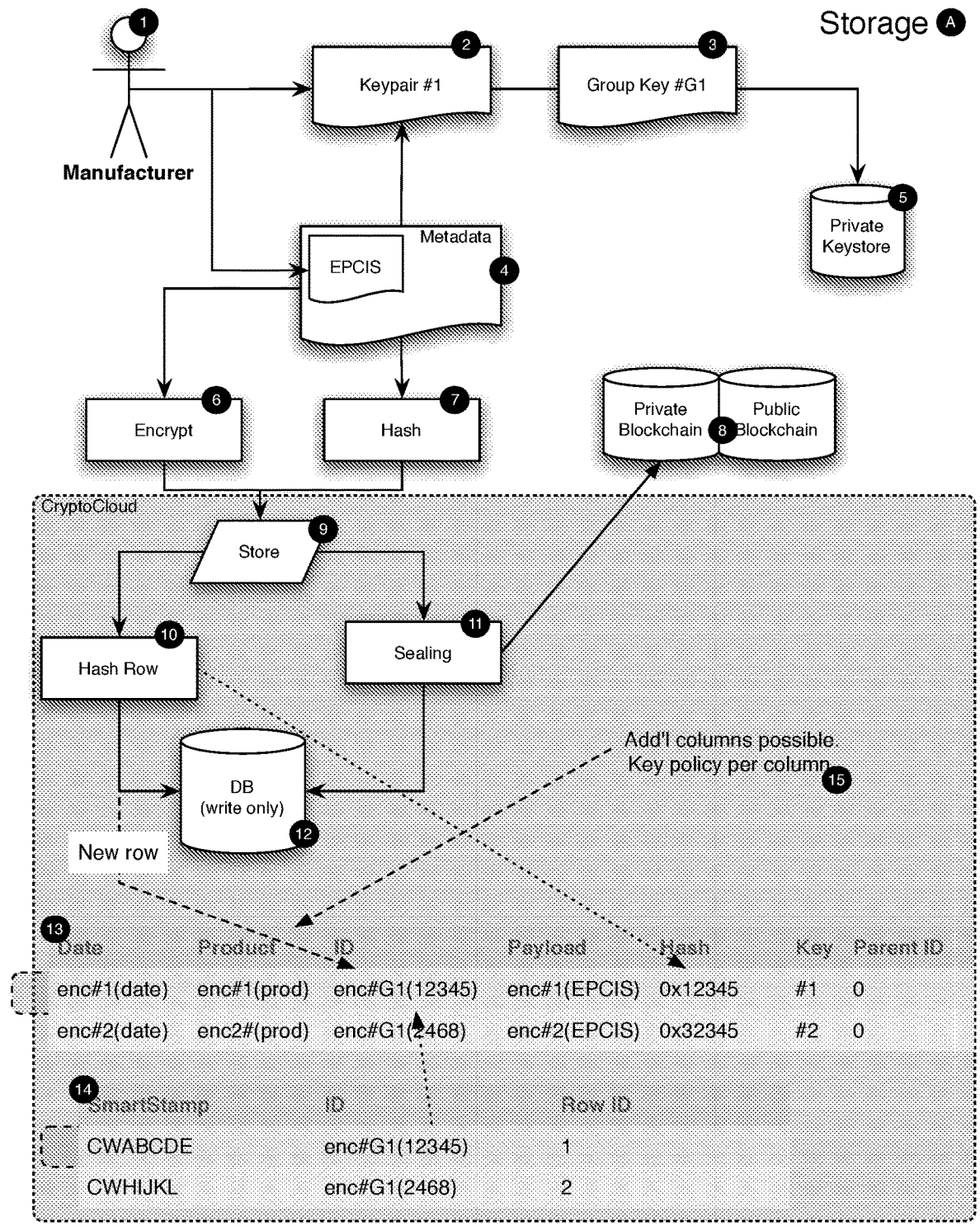
Figure 1: Exemplary embodiment A

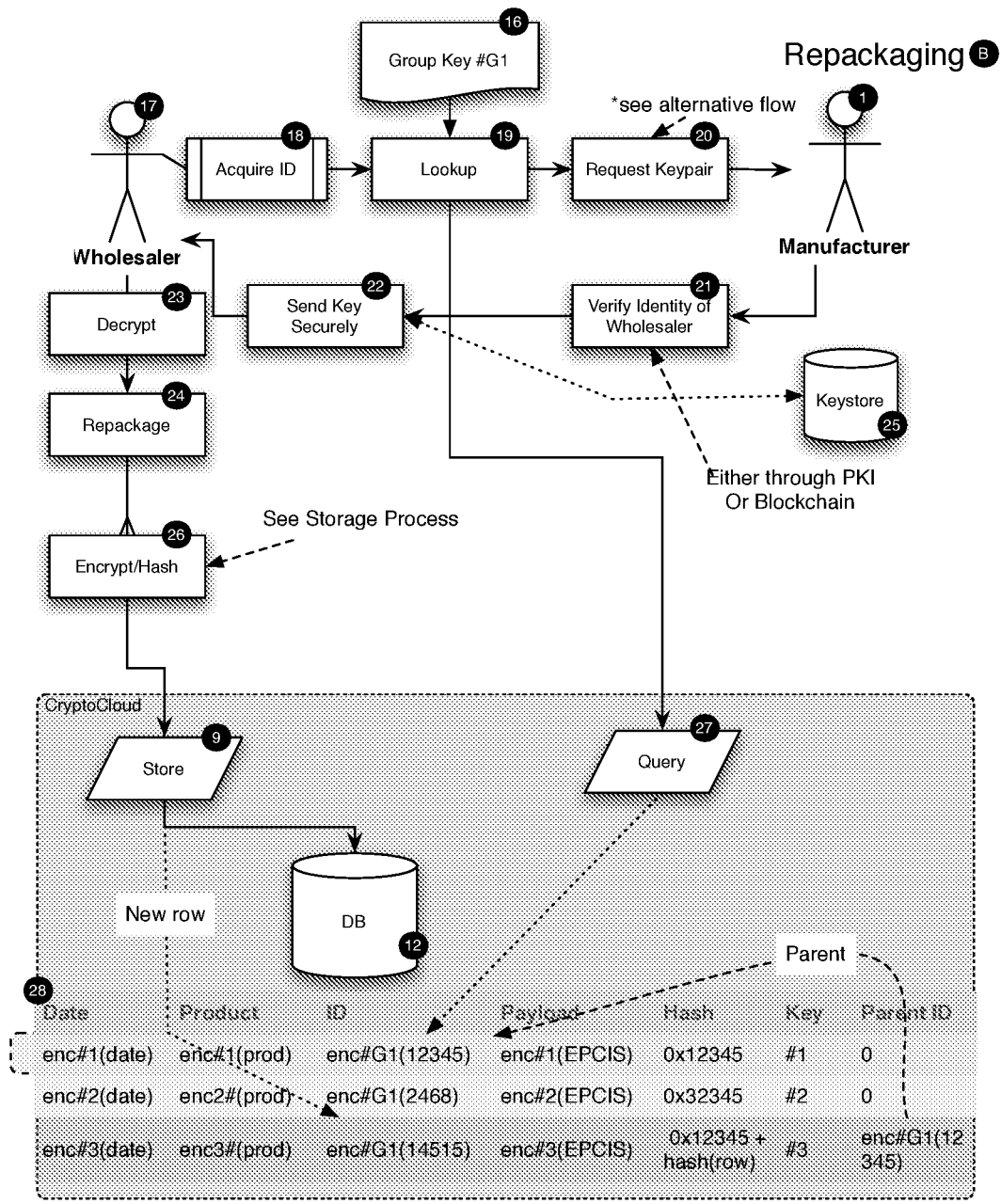
Figure 2: Exemplary embodiment B
Repackaging

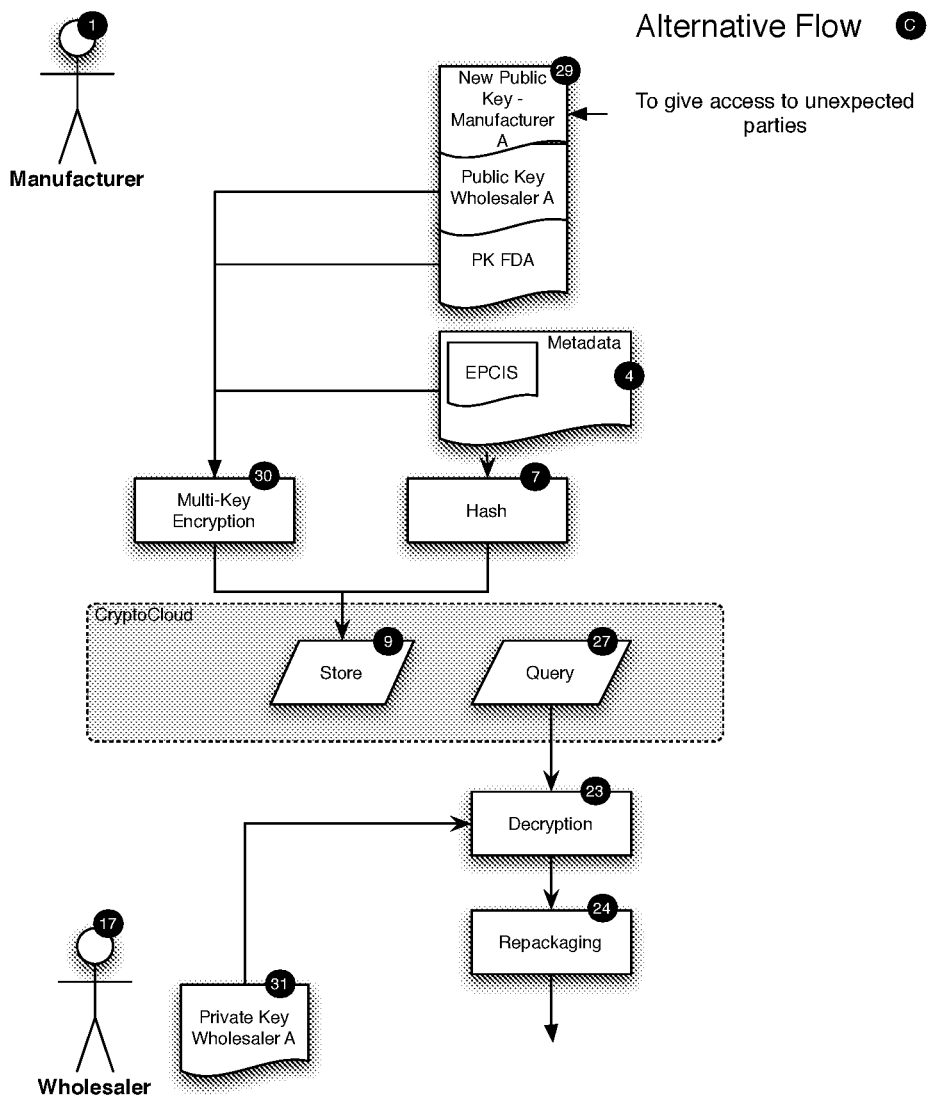
Figure 3: Exemplary embodiment C
Alternative data flow

CRYPTOGRAPHIC DATA STORAGE

CROSS-REFERENCE TO RELATED APPLICATIONS

This application is a continuation of U.S. patent application Ser. No. 16/395,232, filed Apr. 26, 2019, which claims priority to U.S. provisional patent application 62/664,207, filed on Apr. 29, 2018. The contents of the aforesaid application are incorporated herein for all purposes.

BACKGROUND

The present disclosure relates to storing of data, such as confidential data, for example in a cloud service. When storing data and in particular confidential data in a cloud service or on a server, a typical problem is data security. A well-known solution to this problem is to encrypt the data. Most of the current systems use symmetric key encryption, allowing a user to keep the key private, so that the data can be accessed if needed.

An issue with this rather simple approach is that sharing of such encrypted user data is not conveniently possible. The user has to provide the symmetric key to the intended recipient and make sure the transmission of the key itself is secure and that no eavesdropping occurred. In addition and once shared, the user has no control about access and dissemination of the affected data.

SUMMARY

The present inventors have ascertained that an object exists for storing and sharing in particular confidential data. The object is solved by the invention as defined in the independent claims. The dependent claims and the following description provides various embodiments of the invention.

BRIEF DESCRIPTION OF THE DRAWINGS

FIG. 1 shows a flow diagram of a first exemplary embodiment;

FIG. 2 shows a flow diagram of a second exemplary embodiment; and

FIG. 3 shows a flow diagram of a third exemplary embodiment.

DETAILED DESCRIPTION

The present invention suggests multiple methods to share in particular confidential data.

In the following, reference will be made to service data items, i.e., electronic data of any type, length, and content, e.g., a bit string, as defined in PCT application PCT/US2017/044729, entitled "COMPUTER-IMPLEMENTED METHOD AND SYSTEM OF TAMPER-EVIDENT RECORDING OF A PLURALITY OF SERVICE DATA ITEMS", the contents of which application are incorporated herein for all purposes.

In some embodiments, user data, i.e., one or more service data items, is partitioned into one or more data stores, hereinafter also referred to as "crypto buckets". For example, a data store may be provided per service data item. In other examples, multiple service data items may be collectively stored in a given data store. In some embodiments, a data item verification fingerprint may be generated for each data store and then stored using the procedure, discussed in PCT/US2017/044729.

In some embodiments, metadata is generated for each of the data stores. The metadata may then be stored in a searchable database, which simplifies data sharing of some information about the data stores. For example, in a "track-and-trace" application, where the data stores comprise transaction data of a given physical or electronic asset, such as a medication package, the metadata may comprise a quasi-unique identifier of that asset, e.g. a serial number. In some embodiments, the metadata is uploaded to a server or other central entity, e.g., a search engine. In some embodiments, the metadata comprises one or more of the data item verification fingerprint of the associated data store, an aggregated verification fingerprint, and a SmartStamp, as discussed in the above-mentioned PCT application. In some embodiments, the metadata database is configurable, i.e., the user or owner of a service data item may select what data is shared in the metadata database.

In some embodiments, the one or more data stores are kept safe by the respective user, i.e., the data owner. Alternatively and in some embodiments, one or more data stores are encrypted and the encrypted data stores are provided to a shared service system, e.g., a shared server or a cloud service.

In some embodiments, a plurality of data stores are encrypted with different keys. In some embodiments, the non-encrypted meta data can be queried by a central server or system.

In some embodiments, one or more data stores can be decrypted with a key provided by an owner/user of the respective data store.

In some embodiments, a key is used to encrypt queryable metadata fields.

In some embodiments, any data can be stored as a data store.

In some embodiments, one or more data stores may contain data for one day, one item, and/or any combination of items.

In some embodiments, the service data items comprise EPCIS files.

In some embodiments, the result of one service data item in one or more data stores is a new row/entry in a database payload table as well as—after successful sealing—a new row/entry in a verification table.

In some embodiments and when a new row/entry is stored, a hash of the service data items in a data store is created, which may be used for rows/entries referring to this row/entry to create a chain of hashes, so that manipulation can be detected through the use of chained hash codes as well as the verification table.

In some embodiments, a central system or server manages secure connections and authenticated access for all partners/users, and/or query and/or payment facilities.

In some embodiments, storage of the data stores and the metadata is provided by a single service, also referred to as "CryptoCloud".

In some embodiments, many distributed CryptoCloud-Connectors for each partner/user are provided.

In some embodiments, the system can be set up to proactively alert partners/users when certain criteria is met. For example, a notification may be presented to the user/owner of a data store when metadata of the respective data store is accessed.

In some embodiments, a partner/user can request a particular data store, upon which the respective owner/user of this data store is notified. The respective owner/user may then accept or reject the request. In some embodiments, when the request is accepted, the data store or an encryption key for the data store is transmitted to the partner/user. In some embodiments, the system is configured for automatic accepting and rejection of requests, based on logic information, for example, black-/whitelists. In some embodiments, at least some of the data stores comprise access rules, such as black-/whitelists, smart contract rules, etc.

In order to inform such decisions, the system may in some embodiments be set up to allow searching for metadata. In this case, related data stores are determined by the system automatically. The respective owners of the found data stores are informed of the request, and additional request information, such as the identity of the requestor and/or a reason for the request. For example, this can allow the Food and Drug Administration (FDA) to initiate a request regarding particular metadata (such as EPCIS identifiers) with the reason 'investigation' on the system that finds all respective data stores with the particular metadata attached, notifying all respective data store owners regarding the request, who initiated the request and the request's reason. Respective data store owners may then choose to respond to the FDA's request or not, based on criteria, such as regulatory compliance rules that may or may not apply to said data store content and owners in this specific case. This provides granular need-to-know data store access control for each respective data store owner while enabling automatic discovery of data stores and respective compliance in complex regulatory environments without requiring automatic disclosure of data store owners' identities.

In some embodiments, if the request is accepted, a link to the data store for download by the requesting partner/user is transmitted.

In some embodiments, if the request is accepted, the respective encryption key for the data store, and/or a link to the data store for download by the requestor and decryption with the respective encryption key is transmitted using an external system (for example, email or secure messaging system).

In some embodiments, if the request is accepted, the user/owner sends a charge request to the requestor partner/user for the data store. In some embodiments, upon receiving payment, the respective encryption keys for the data store, and/or a link to the data store for download by the requestor and decryption with the respective keys are provided to the requestor partner/user.

In some embodiments, whitelist and blacklist databases are provided. For example, if Partner A sells forward scanning data to Partner B, but wants to ensure the data isn't being sold to Partner C, a condition is defined. If Partner B requests the data, the request is automatically accepted and the keys are sent. But if Partner C requests the data, the system will notify Partner A to make a manual decision.

In some embodiments, the system runs code that is agreed upon by at least two of the participants, hashed and the hash anchored in one or more blockchains. Before running the code, the system can hash the code, compare the hash with the respective originally anchored hash and thus ensure authenticity of the code before execution. This code can, for example, run queries according to specific rules as described above, periodically hash stored data stores and compare respective hashes originally anchored in respective one or more blockchains to detect tampered data stores and to alert participants accordingly, and so forth.

In some embodiments, one or more write and/or read operation events and one or more service data items are hashed and the hashes are stored in one or more distributed ledgers and/or blockchains.

The invention will now be described in greater detail with reference to the FIGS. In FIG. 1, a storage use case whereas a user of the system (1) is storing files into a data store is discussed.

1. Typical user of the system of the present embodiment executing a workflow. In this example, the manufacturer of an item/items.
2. A key or keypair generated by (1) for encrypting the payload (data store).
3. Optional: A key made available to a group of participants in the system. This key is used to encrypt query-able metadata fields. Only owners of this key can query the appropriate column in (12). Alternatively, the metadata fields are non-encrypted.
4. The payload to be stored, for example an EPCIS file as well as other metadata relevant for storage.
5. A keystore private to (1) to securely store keys like (2).
6. Process of encrypting the payload with the chosen key (2).
7. Hashing of (4) with a hash function supported by the sealing process (11).
8. Blockchain or distributed ledger technology used in (11).
9. Process of storing the data store using (10) and (11). The result is a new row in the database (12) payload table (13) as well—after successful sealing—a new row in the verification table (14).
10. Storing of a new row in (13) as well as creating a hash of the data. The hash is later used for rows referring to this row to create a chain of hashes.
11. Sealing of the unencrypted payload hash (7) using the Cryptowerk sealing API.
12. Database of data stores and verification information with at least tables outlined in (13) and (14). The Database offers only an append operation for entries. Entries cannot be deleted or changed afterwards. Should such changes be done outside of the databases control, manipulation can be detected through the use of chained hash codes as well as the verification table.
13. A snapshot of the payload table containing encrypted metadata and the encrypted payload. Note that different keys are used for some of the metadata like the ID of the entry. As seen in the aggregation use case in (18), the ID is transferred to another user in its unencrypted form. The number and kind of columns is configurable to the use case. Mandatory columns are:
    a. ID—the ID of the item to be tracked. There can be several rows for each ID
    b. Payload—the data store with (4) encrypted by key (2)
    c. Hash—a hash of all columns of the row (safe Hash)
    d. Key—an opaque reference to the key used (2)
    e. Parent ID—to build a sequence of events affecting ID, ParentID points to an earlier event affecting ID
14. Verification table, contains a SmartStamp generated through Sealing (11) that allows to verify the content of the payload—i.e. after decryption the referenced entry (via a Row ID taken from 13) can be compared via the Cryptowerk verification API.
15. Metadata columns are either encrypted via one or more key (2) that is specific to a new row added to (13) or a well-known key (3).

FIG. 2 shows a flow chart of a further embodiment.

16. A copy of (3) to be used by (17).
17. A user of the system. In this example a Wholesaler who would like to repackage items from data stores and create a suitable record.

18. Process of acquiring the ID of an item (as generated in 4). For example, by scanning a shipping label.
19. Lookup of the correct row in (12) (the latest row for the ID is returned). Note that (17) has to use (16) to encrypt the ID, then use the encrypted value for querying.
20. Wholesaler (17) is requesting the key #1 as created in (2) from Manufacturer (1)
21. (1) verifies the request coming from (17) through secure means like using PKI or a Blockchain identification scheme.
22. The key (2) is sent to (17) and stored in a private keystore (25) (which is optional but speeds up repeated lookups).
23. Now (17) is able to decrypt all metadata fields and the payload for the row queried in (19). If metadata is non-encrypted, no decryption of the metadata is necessary.
24. The Wholesaler (17) is making modifications or aggregations to an item.
25. Optional private key store of (17).
26. Process outlined in (A) is used to store a new data store via (9) with two crucial changes: The ParentID is set to the original ID, the hash code calculated for the new row incorporates the hash code of the parent row.
27. The Query engine of the system.
28. The Payload table with the added row.

FIG. 3 describes processes using PKI to make the encrypted data available only to owners of corresponding private keys. This assumes that at time of data store creation the intended recipients are known.

1. A list of public keys for which the data stores is made available.
2. A multi-key encryption process allows for the payload to be decrypted by the owners of the private key of (29). The metadata symmetrical encryption key is available in a separate column of the payload table.
3. The corresponding private key to the public key in (29).

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method of storing a plurality of service data items, wherein
the plurality of service data items are partitioned into a plurality data stores;
encrypting a given one of each of the one or more data stores with a given encryption key of a plurality of encryption keys, the given encryption key to differ from other encryption keys of the plurality of encryption keys used to encrypt other data stores of the plurality of data stores;
the plurality of data stores are stored;
metadata of the plurality of data stores is generated, the metadata including a data item verification fingerprint generated for each of the data stores;
the metadata, including the data item verification fingerprint generated for each of the data stores, is stored in a metadata database; wherein
one or more of the data stores comprise a link to at least one further data store; and wherein the one or more data stores in addition to the link further comprise a first encryption key, the first encryption key included in the plurality of encryption keys and used to encrypt the at least one further data store.

2. The method of claim 1, wherein an aggregated verification fingerprint is determined from the data item verification fingerprints, and wherein the aggregated verification fingerprint is stored in at least one blockchain.

3. The method of claim 2, wherein the aggregated verification fingerprint has a bit length, which is less than a bit length of a concatenation of the data item verification fingerprints.

4. The method of claim 1, wherein the metadata comprises at least one or more quasi-unique identifiers of the plurality of service data items, contained in the associated data store.

5. The method of claim 1, wherein the metadata database is searchable.

6. The method of claim 1, wherein the plurality of data stores are encrypted.

7. The method of claim 1, wherein the plurality of encrypted data stores are stored in a shared storage system.

8. The method of claim 1, wherein the metadata comprises non-encrypted data.

9. The method of claim 1, wherein one or more of the data stores comprise EPCIS files.

10. The method of claim 1, wherein the metadata database may be queried and upon a match between query information of a query and stored metadata, a notification is transmitted to a user, the user associated with the stored metadata.

11. The method of claim 10, wherein the query comprises one or more of a requestor identifier and a request reason.

12. The method of claim 11, wherein one or more of the requestor identifier and the request reason are transmitted to the user, the user associated with the stored metadata.

13. The method of claim 11, wherein the requestor identifier is verifiable using at least one blockchain.

14. A system for storing a plurality of service data items, comprising
an interface for receiving a plurality of service data items;
a data store manager, configured to partition the plurality of service data items into a plurality of data stores and to store the plurality of data stores and to encrypt a given one of each of the plurality of data stores with a given encryption key of a plurality of encryption keys, the given encryption key to differ from other encryption keys of the plurality of encryption keys used to encrypt other data stores of the plurality of data stores;
a metadata handler for generating metadata of the plurality of data stores, the metadata including a data item verification fingerprint generated for each of the data stores; and
a metadata database, configured to receive and store the generated metadata including the data item verification fingerprint generated for each of the data stores;
wherein one or more of the data stores comprise a link to at least one further data store; and
wherein the one or more data stores in addition to the link further comprise a first encryption key, the first encryption key included in the plurality of encryption keys and used to encrypt the at least one further data store.

* * * * *